United States Patent [19]

Back et al.

[11] Patent Number: 4,623,358

[45] Date of Patent: Nov. 18, 1986

[54] PROCESS FOR DYEING NATURAL OR SYNTHETIC POLYAMIDE FIBRE MATERIALS WITH 1:1 METAL COMPLEX DYES AND FLUORIDE, FLUOROSILICATE OR FLUOROBORATE

[75] Inventors: Gerhard Back, Lörrach, Fed. Rep. of Germany; Walter Mosimann, Therwil, Switzerland

[73] Assignee: Ciba-Geigy Corporation, Ardsley, N.Y.

[21] Appl. No.: 737,112

[22] Filed: May 23, 1985

[30] Foreign Application Priority Data

May 30, 1984 [CH] Switzerland .......................... 2667/84

[51] Int. Cl.$^4$ .......................... C09B 67/24; D06P 1/67
[52] U.S. Cl. .......................... 8/620; 8/630;
8/632; 8/680; 8/685; 8/917; 8/924; 8/618
[58] Field of Search .................... 8/620, 630, 632, 685

[56] References Cited

U.S. PATENT DOCUMENTS

| | | | |
|---|---|---|---|
| 3,592,584 | 7/1971 | Link et al. | 8/589 |
| 3,630,662 | 12/1971 | Brody et al. | 8/613 |
| 3,857,727 | 12/1974 | Benisek | 8/490 |
| 3,990,842 | 11/1976 | Millsaps | 8/632 |
| 4,444,564 | 4/1984 | Salathe et al. | 8/588 |

FOREIGN PATENT DOCUMENTS 1181583 2/1970 United Kingdom.
1275459 5/1972 United Kingdom.

Primary Examiner—A. Lionel Clingman
Attorney, Agent, or Firm—Edward McC. Roberts; Meredith C. Findlay; Irving M. Fishman

[57] ABSTRACT

The invention relates to a process for dyeing natural or synthetic polyamide fibre material levelly from an aqueous liquor, with 1:1 metal complex dyes which contain sulfo groups, in the presence of an alkali metal salt or an ammonium salt and optionally in the presence of an assistant, which comprises carrying out dyeing in the presence of an alkali metal fluoride or ammonium fluoride, of an alkali metal fluorosilicate or ammonium fluorosilicate, or of an alkali metal fluoroborate or ammonium fluoroborate, at a pH in the range from 3 to 7.

The process of this invention is suitable for dyeing natural or synthetic polyamide material in level shades of good fastness properties.

35 Claims, No Drawings

PROCESS FOR DYEING NATURAL OR SYNTHETIC POLYAMIDE FIBRE MATERIALS WITH 1:1 METAL COMPLEX DYES AND FLUORIDE, FLUOROSILICATE OR FLUOROBORATE

The present invention relates to a process for dyeing natural and synthetic polyamide fibre materials levelly with 1:1 metal complex dyes from an aqueous liquor in the presence of an alkali metal fluoride or ammonium fluoride, an alkali metal fluorosilicate or ammonium fluorosilicate or an alkali metal fluoroborate or ammonium fluoroborate, and optionally in the presence of an assistant, in which process dyeing is carried out at a mild pH value in the range from 3 to 7, the dyebath is almost completely exhausted and the dyeing has good allround fastness properties, in particular good wetfastness and good lightfastness properties, and to the material dyed by said process and to a composition for carrying out the dyeing.

The disadvantage of the conventional methods of dyeing natural or synthetic polyamide fibre materials with 1:1 metal complex dyes is that these dyes must be applied in the pH range from about 1.9 to 2.8 in order to obtain level dyeings. In addition to the duration of dyeing, the pH of the dyebath is of decisive importance for dyeing natural and synthetic polyamide fibre materials, especially for dyeing wool, as these fibre materials, again in particular wool, are severely attacked both in the strongly acidic and in the strongly alkaline pH range.

Surprisingly, there has now been found a novel process that does not have the shortcoming referred to above and which makes it possible to dye natural or synthetic polyamide materials, in simple manner, in the mild pH range from 3 to 7, preferably from 4 to 6.

Accordingly, the present invention provides a process for dyeing natural or synthetic polyamide fibre material levelly from an aqueous liquor with 1:1 metal complex dyes which contain sulfo groups, in the presence of an alkali metal salt or an ammonium salt and optionally in the presence of assistants, which comprises carrying out dyeing in the presence of an alkali metal fluoride or ammonium fluoride, of an alkali metal fluorosilicate or ammonium fluorosilicate, or of an alkali metal fluoroborate or ammonium fluoroborate, at a pH in the range from 3 to 7.

The eligible 1:1 metal complex dyes are preferably monoazo dyes or disazo dyes which contain a chromium ion as metal ion.

Depending on the desired depth of shade, the amounts in which the 1:1 metal complex dyes are used in the dyebaths may vary within wide limits. In general, amounts from 0.01 to 10 percent by weight, based on the goods to be dyed, of one or more dyes are advantageous.

It has long been known to dye natural or synthetic polyamide fibre materials with 1:1 metal complex dyes in the presence of an alkali metal sulfate or alkali metal chloride, for example sodium sulfate and sodium chloride, and optionally of an assistant. Surprisingly, the use of an alkali metal fluoride, ammonium fluoride, of an alkali metal fluorosilicate or ammonium fluorosilicate, or of an alkali metal fluoroborate or ammonium fluoroborate, optionally in the presence of an assistant, makes it possible to dye these fibre materials in a mild pH range.

In the process of this invention, it is preferred to use sodium or potassium fluoride as alkali metal fluoride.

The alkali metal fluorosilicate or ammonium fluorosilicate employed in the process of this invention is the alkali metal salt or ammonium salt of hexafluorosilicic acid. It is preferred to use $Na_2SiF_6$, $K_2SiF_6$ or $(NH_4)_2SiF_6$.

The alkali metal fluoroborate or ammonium fluoroborate employed in the process of the invention is the alkali metal salt or ammonium salt of fluoroboric acid. It is preferred to use $NaBF_4$, $KBF_4$ or $NH_4BF_4$.

Preferred embodiments of the process of the present invention comprise:

(a) dyeing in the presence of an alkali metal fluoride or ammonium fluoride,
(b) dyeing in the presence of an alkali metal fluoride, preferably sodium or potassium fluoride,
(c) dyeing in the presence of ammonium fluoride,
(d) dyeing in the presence of an alkali metal fluorosilicate or ammonium fluorosilicate,
(e) dyeing in the presence of an alkali metal fluorosilicate, preferably sodium or potassium fluorosilicate,
(f) dyeing in the presence of ammonium fluorosilicate,
(g) dyeing in the presence of an alkali metal fluoroborate or an ammonium fluoroborate, and
(h) dyeing in the presence of an alkali metal fluoride or ammonium fluoride and of an assistant or mixture of assistants.

The amount in which the alkali metal fluoride or ammonium fluoride, alkali metal fluorosilicate or ammonium fluorosilicate or alkali metal fluoroborate or ammonium fluoroborate is employed in the dyebaths may vary within wide limits. In general, half to four times the amount by weight, preferably one to three times the amount by weight and, most preferably, two to three times the amount by weight, of alkali metal fluoride or ammonium fluoride, alkali metal fluorosilicate or ammonium fluorosilicate, or of alkali metal fluoroborate or ammonium fluoroborate, based on the amount by weight of dye, has proved advantageous.

The assistants suitable for use in the process of this invention are known per se and are prepared by known methods. Preferably, they are levelling assistants or mixtures of different levelling assistants. Suitable levelling assistants are anionic, cationic, nonionic and amphoteric compounds or mixtures thereof.

Examples of suitable anionic compounds are: substituted naphthalenesulfonic acids, sulfonic acid hemiesters of ethoxylates, salts of alkanesulfonic acids of longer chain length, salts of alkylarylsulfonic acids, in particular dodecylbenzenesulfonic acids, fatty acid amide sulfonic acids, and sulfuric acid hemiesters of fatty amine polyglycol ethers. Representative examples of cationic compounds are: polyglycol ethers of fatty amines, polyglycol ethers of fatty acid amide-amines, and quaternary ammonium compounds. Typical examples of nonionic compounds are: polyglycol ethers of fatty alcohols, of alkylphenols, of resinic acids, and of fatty acid alkylolamides. Typical examples of amphoteric compounds are: reaction products of ethoxylated fatty amines and hydroxyethanesulfonic acids, reaction products of phenol and styrene, and polyethylene glycol di-fatty acid esters.

It is preferred to use levelling assistant compositions containing compounds of the formula

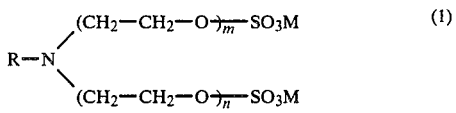

(1)

wherein R is an alkyl or alkenyl radical of 12 to 22 carbon atoms, M is hydrogen, an alkali metal or ammonium cation, and m and n are integers, the sum of m+n being from 2 to 14; or compounds of the formula

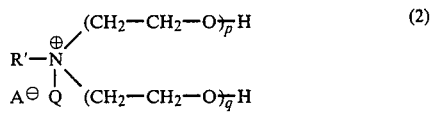

(2)

wherein R' independently of R has the meaning of R, A is an anion, Q is an unsubstituted or substituted alkyl radical and p and q are integers, the sum of p+q being from 2 to 50; or compounds of the formula

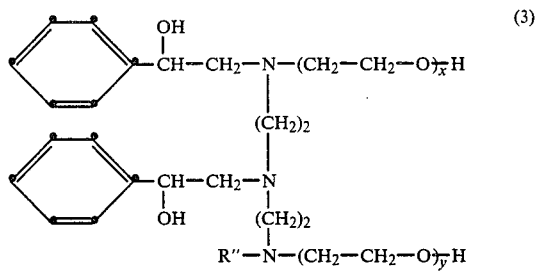

(3)

wherein R" independently of R has the meaning of R and x and y are integers, the sum of x+y being from 80 to 140; or a mixture containing compounds of the formulae (1) and (2) or a mixture containing compounds of the formulae (1), (2) and (3).

It is particularly preferred to use a mixture of levelling assistants comprising 5 to 70 parts by weight of a compound of the formula (1), 15 to 60 parts by weight of the compound of formula (2), and 5 to 60 parts by weight of the compound of formula (3), based on 100 parts by weight of said mixture, wherein R, R' and R" in formulae (1), (2) and (3) are independently an alkyl or alkenyl radical of 16 to 22 carbon atoms.

It is advantageous to use a compound of formula (2), wherein A and Q are derived from a quaternising agent selected from the group consisting of chloroacetamide, ethylene chlorohydrin ethylene bromohydrin, epichlorohydrin, epibromohydrin or, preferably, dimethyl sulfate.

In the process of this invention it is preferred to use a mixture of levelling assistants which, in addition to comprising the compounds of the formulae (1), (2) and (3), wherein the sum of p+q in formula (2) is preferably from 20 to 50, also contains an adduct of 60 to 100 moles of ethylene oxide with 1 mole of a $C_{15}$-$C_{20}$alkenyl alcohol.

It is also preferred to use a mixture of levelling assistants which contains the compounds of the formulae (1) and (2), wherein the sum of p+q in formula (2) is 4 to 10.

It is further preferred to use a mixture of levelling assistants which contains compounds of formula (2), wherein the sum of p+q in formula (2) is 30 to 40, and R' is a $C_{15}$-$C_{22}$alkyl radical.

The amount in which the levelling assistant or mixture of levelling assistants is added to the dyebaths can vary within wide limits; but in general an amount of 0.3 to 3 percent by weight, based on the fibre material, of the levelling assistant or mixture thereof, has proved advantageous.

The dyebaths may contain, as further assistants, mineral acids such as sulfuric acid, sulfamic acid or phosphoric acid, or organic acids, preferably lower aliphatic carboxylic acids such as formic acid, acetic acid or maleic acid. These acids are employed in particular for adjusting the pH of the dyebath. It is preferred to adjust the pH of 3 to 7 with an organic acid, preferably with acetic acid. Dyeing is preferably carried out in the pH range from 4 to 6, most preferably from 4 to 5.

The dyebath may further contain, as assistants, salts other than alkali metal fluorides or ammonium fluorides, alkali metal fluorosilicates or ammonium fluorosilicates or alkali metal fluoroborates or ammonium fluoroborates, in particular ammonium salts or alkali metal salts, for example ammonium sulfate, ammonium acetate or, preferably, sodium acetate or sodium sulfate. It is preferred to use 0.1 to 10 percent by weight of ammonium salt or alkali metal salt, based on the fibre material.

The 1:1 metal complex dyes suitable for use in the process of this invention are preferably 1:1 chromium complex azo dyes containing 1 to 3 sulfonic acid groups, in particular 1 to 2 sulfonic acid groups.

It is also possible to use mixtures of 1:1 chromium complex azo dyes which contain sulfo groups in the process of this invention. It is preferred to use a mixture of dyes as defined herein comprising (a) at least two dyes; or
(b) at least three dyes; or,
(c) for trichromatic dyeing, at least three dyes selected from yellow or orange, red and blue dyes.

By trichromatic dyeing is meant the additive blending of suitably chosen yellow or orange, red and blue dyes with which each desired shade of the visible colour spectrum may be adjusted by appropriate choice of the quantity ratios.

1:1 Chromium complex azo dyes employed in the process of this invention are, in particular, those of the formula

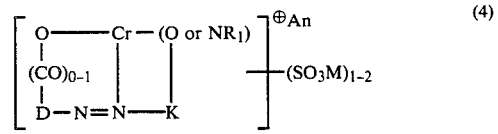

(4)

wherein $-(CO)_{0-1}O-$ and $-O-$ or $-NR_1)$ are linked to D and K adjacent to the azo bridge, D is the radical of a diazo component of the benzene or naphthalene series, K is the radical of a coupling component of the benzene, naphthalene or heterocyclic series or of the acetoacetarylide series, $R_1$ is hydrogen or an unsubstituted or substituted alkyl or phenyl radical, M is a cation and An is an anion.

In the process of this invention it is preferred to use sulfo group containing 1:1 chromium complex azo dyes of the formula (4), wherein D is a radical of the benzene or naphthalene series which is unsubstituted or substituted by halogen, $C_1$-$C_4$alkyl, $C_1$-$C_4$alkoxy, nitro or sulfamoyl, K is a phenyl, naphthyl, 1-phenyl-3-methyl-pyrazol-5-one, acetoacetamide, preferably acetoacetanilide, or quinoline radical, each unsubstituted or substituted by halogen, $C_1$-$C_4$alkyl, $C_1$-$C_4$alkoxy, $C_2$-$C_4$alkanoylamino, sulfamoyl or hydroxy, $R_1$ is hydrogen and M is an alkali metal cation.

The 1:1 metal complex azo dyes which contain sulfo groups employed in the process of this invention are either in the form of the free sulfonic acid or, preferably, of salts thereof.

Examples of suitable salts are alkali metal, alkaline earth metal or ammonium salts, or the salts of an organic amine. Representative examples are the sodium, lithium, potassium or ammonium salts or the salt of triethanolamine.

The 1:1 metal complex dyes which contain sulfo groups employed in the process of this invention are known per se and can be obtained by known methods.

If mixtures of dyes are used in the process of the invention, these may be prepared by mixing the individual dyes. Mixing is carried out in suitable mills, e.g. ball or pin mills, as well as in kneaders or mixers.

Further, the mixtures can also be prepared by spray drying aqueous dye mixtures.

In addition to containing the dye and the aforementioned assistants, the dyebaths may contain further conventional auxiliaries, for example wool protecting agents, wetting agents and antifoams.

The liquor to goods ratio may be chosen within a wide range from 1:6 to 1:80, preferably from 1:10 to 1:30.

Dyeing is carried out from an aqueous bath by the exhaust process, for example in the temperature range from 80° to 105° C. or 110° C. when using a wool protecting agent that splits off formaldehyde, preferably in the range from 98° to 103° C. The dyeing time is normally from 30 to 120 minutes.

Special apparatus is not required for carrying out the process of the invention. The conventional dyeing machines, e.g. for flocks, tops, hank yarn, packages, piece goods and carpets, may be used.

The levelling assistant and the alkali metal fluoride or ammonium fluoride, alkali metal fluorosilicate or ammonium fluorosilicate, alkali metal fluoroborate or ammonium fluoroborate is conveniently added to the aqueous dyebath and applied simultaneously with the dye. An alternative procedure is to treat the goods to be dyed first with the levelling assistant and then to dye the goods, in the same bath, after addition of the dye and of the alkali metal fluoride or ammonium fluoride, alkali metal fluorosilicate or ammonium fluorosilicate, alkali metal fluoroborate or ammonium fluoroborate. It is preferred to put the fibre material into a bath which contains acid and the assistant and has a temperature of 30° to 70° C. Then the dye or a dye mixture and the alkali metal fluoride or ammonium fluoride, alkali metal fluorosilicate or ammonium fluorosilicate, alkali metal fluoroborate or ammonium fluoroborate is added and the temperature of the dyebath is raised at a rate of 0.75 to 3° C. per minute, optionally with a temperature stop during the heating up phase, in order to dye in the indicated temperature range from 80° to 105° C., preferably for 30 to 120 minutes. Finally, the bath is cooled and the dyed material is rinsed and dried in conventional manner.

Natural polyamide fibre material that may be dyed by the process of this invention is, in particular, wool and also wool/polyamide, wool/polyester, wool/cellulose or wool/polyacrylonitrile blends as well as silk. The fibre material may be in a very wide range of presentation, for example as loose material, tops, yarn and piece goods or carpets.

Synthetic polyamide material that may be dyed by the process of this invention comprises all known synthetic polyamides. The fibre material may be in a very wide range of presentation, for example as loose material, tops, yarn and piece goods or carpets.

A particularly preferred embodiment of the process of this invention comprises dyeing natural or synthetic polyamide fibre material, preferably wool, with at least one 1:1 chromium complex dye of formula (4), in the presence of sodium fluoride, ammonium fluorosilicate or sodium fluorosilicate, preferably in two to three times the amount by weight, based on the amount by weight of 1:1 chromium complex dye, and optionally in the presence of a levelling assistant comprising compounds of the formula (2) or a mixture of compounds of the formulae (1) and (2) or (1), (2) and (3), and in the presence of sodium acetate, ammonium acetate or sodium sulfate, in the pH range from 4 to 5.

Compared with the known processes for dyeing natural or synthetic polyamide fibre material, the process of this invention has the following advantages in addition to those already mentioned above. The material dyed under the dyeing conditions has better allround fastness properties, in particular better wetfastness properties. A further essential advantage is that the dyes are taken up almost completely onto the fibre. When dyeing is complete, the dyebaths are almost completely exhausted.

The invention further relates to a composition for carrying out the process of the invention. The composition is a solid mixture containing at least one 1:1 metal complex azo dye which contains sulfo groups, in particular a 1:1 chromium complex dye, and an alkali metal fluoride or ammonium fluoride, alkali metal fluorosilicate or ammonium fluorosilicate, or alkali fluoroborate or ammonium fluoroborate.

The composition of this invention is prepared by mixing a 1:1 chromium complex dye which contains sulfo groups with an alkali metal fluoride or ammonium fluoride, alkali metal fluorosilicate or ammonium fluorosilicate, or alkali metal fluoroborate or ammonium fluoroborate. Mixing is carried out, for example, in suitable mills, e.g. ball or pin mills, as well as in kneaders or mixers.

Preferred compositions contain at least one 1:1 chromium complex dye and sodium or ammonium fluoride or sodium or ammonium fluorosilicate.

The preferred 1:1 chromium complexes in the composition of this invention are those of the formula (4).

The solid mixtures can be used for dyeing natural or synthetic polyamide fibre materials.

The invention is illustrated by the following Examples, in which parts and percentages are by weight. The relationship of parts by weight to parts by volume is the same as that of the gram to the cubic centimeter. The indicated amounts of dye refer to commercially available dye.

EXAMPLE 1

800 parts of worsted spun yarn are pretreated for 15 minutes at 50° C. in a dyebath which contains, in 20,000 parts of deionised water of 50° C., 32 parts of 80% acetic acid, 20 parts of crystalline sodium acetate and 12 parts of a levelling assistant comprising 14.6 parts of the anionic compound of the formula

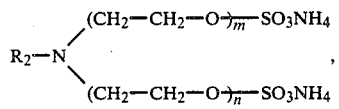

wherein $R_2$ is the hydrocarbon radical of tallow fatty amine, $m+n=8$;

21.0 parts of the quaternary compound of the formula

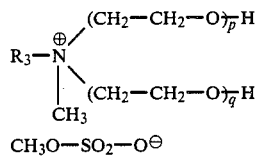

$p+8=34$, wherein $R_3$ is a $C_{20}$–$C_{22}$ hydrocarbon radical;

7.7 parts of the reaction product of oleyl alcohol with 80 moles of ethylene oxide; and 7 parts of the compound of the formula

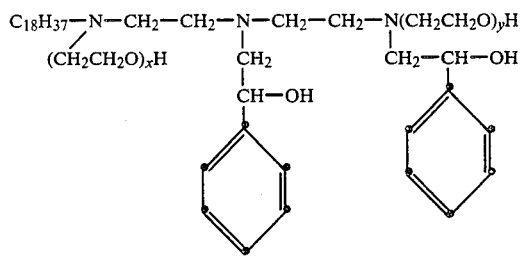

$x+y=$ c. 100 and 49.7 parts of water, based on 100 parts of the levelling assistant. After addition of a warm solution of 50° C. of 5.92 parts of the 1:1 chromium complex of the dye of the formula

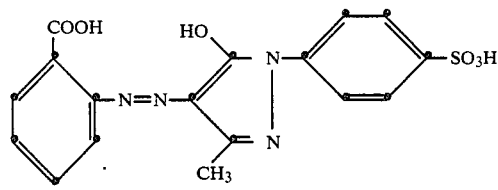

5.12 parts of the 1:1 chromium complex of the dye of the formula

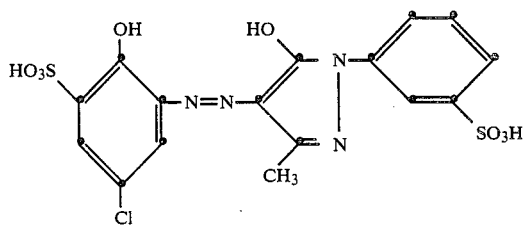

2.0 parts of the 1:1 chromium complex of the dye of the formula

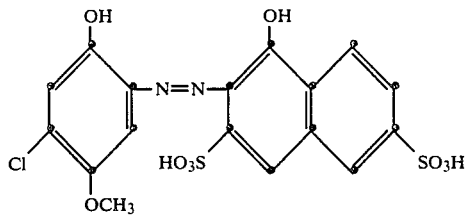

and 3.0 parts of the 1:1 chromium complex of the dye of the formula

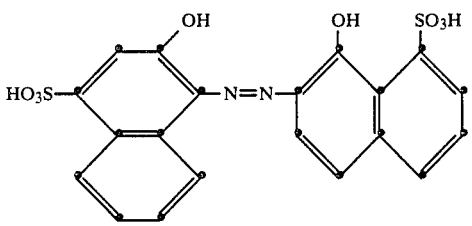

and 37 parts of sodium fluoride in 1000 parts of water, the dyebath is kept for 10 minutes at 50° C. and then heated to 98° C. at a heating-up rate of 1° C./min. The pH is 4.4 at the commencement of dyeing. After a dyeing time of 90 minutes at 98° C., the brown wool yarn is rinsed first for 10 minutes at 50° C. and then for 10 minutes at room temperature, and dried in conventional manner. The pH is 4.5 at the end of dyeing. The medium brown dyeing obtained has excellent levelness and the dyed yarn has a full, soft handle. The residual liquor is practically colourless.

A dyeing obtained on yarn by the above process with the same dyes, but without the addition of sodium fluoride, is highly unlevel and quite markedly weaker. The residual liquor is still noticeably coloured.

EXAMPLE 2

800 parts of worsted spun yarn are pretreated for 15 minutes at 50° C. in a dyebath which contains, in 20,000 parts of water of 50° C., 64 parts of sodium sulfate, 24 parts of $(NH_4)_2SiF_6$ and 12 parts of a levelling assistant comprising 24.0 parts of the anionic compound of the formula

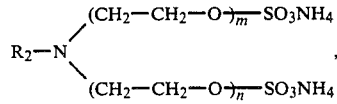

wherein $R_2$ is $C_{16}$–$C_{18}$ hydrocarbon carbon radical and the sum of $m+n$ is 7;

24.0 parts of the quaternary compound of the formula

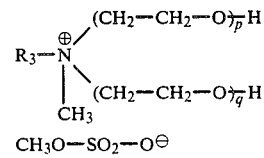

$p+q=34$, wherein $R_3$ is a $C_{20}$–$C_{22}$ hydrocarbon radical;

5.0 parts of ammonium chloride
3.0 parts of oxalic acid,
and 44 parts of water, based on 100 parts of the levelling assistant. After addition of a solution of 4.4 parts of the 1:1 chromium complex of the dye of the formula

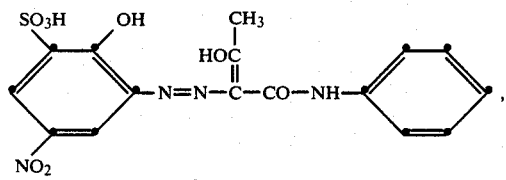

4.8 parts of the 1:1 chromium complex of the dye of the formula

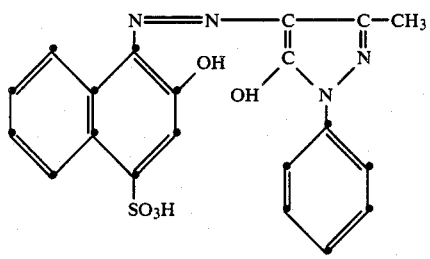

1.2 parts of the 1:1 chromium complex of the dye of the formula

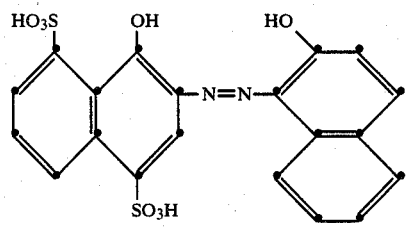

and 1.3 parts of the 1:1 chromium complex of the dye of the formula

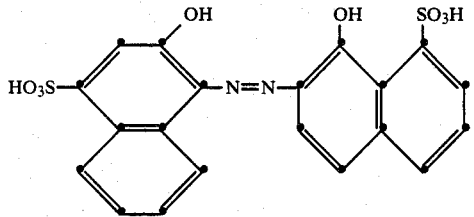

the dyebath is kept for 10 minutes at 50° C. and then heated to 98° C. at a heating-up rate of 0.8° C./min. The pH is 4.6 at the commencement of dyeing. After a dyeing time of 90 minutes at 98° C., the bath is cooled to 50° C. and drained off. The brown wool yarn is rinsed first for 10 minutes at 50° C. and then for 10 minutes at room temperature, and dried in conventional manner. The medium brown dyeing obtained has excellent levelness and has good fastness properties.

EXAMPLE 3

800 parts of worsted spun yarn are pretreated for 15 minutes at 50° C. in a dyebath which contains, in 20,000 parts of water of 50° C., 64 parts of sodium sulfate, 25 parts of $Na_2SiF_6$, 18 parts of 80% acetic acid and 12 parts of the levelling assistant employed in Example 2. After addition of a solution of 3.85 parts of the 1:1 chromium complex of the dye of the formula

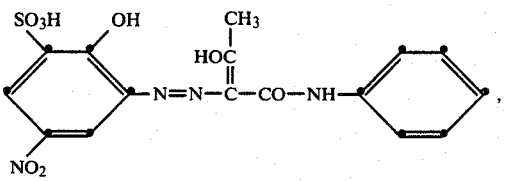

4 parts of the 1:1 chromium complex of the dye of the formula

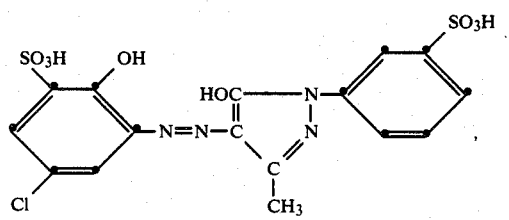

2 parts of the 1:1 chromium complex of the dye of the formula

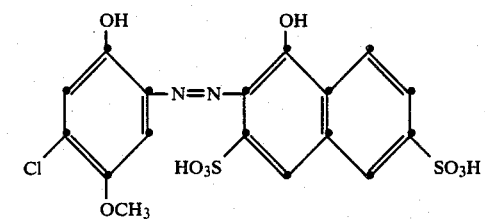

and 3 parts of the 1:1 chromium complex of the dye of the formula

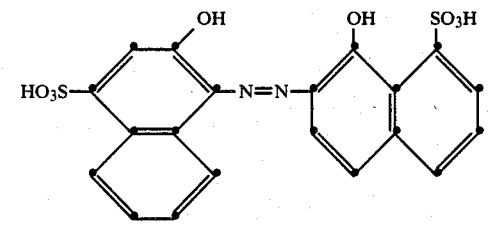

the dyebath is kept for 10 minutes at 50° C. and then heated to 70° C. at a heating-up rate of 1° C./min, kept for 20 minutes at 70° C. and then heated to 85° C. at a rate of 1° C./min. The pH is 4.5 at the commencement of dyeing. After a dyeing time of 120 minutes at 85° C., the bath is cooled to 50° C. and drained off. The brown wool yarn is rinsed first for 10 minutes at 50° C. and then for 10 minutes at room temperature, and dried in conventional manner. The full brown dyeing obtained has excellent levelness and has good fastness properties. A dyeing obtained on yarn by the above process with the same dyes, but without the addition of $Na_2SiF_6$, is highly unlevel and quite substantially weaker.

EXAMPLE 4

800 parts of worsted spun yarn are pretreated for 15 minutes at 50° C. in a dyebath which contains, in 20,000 parts of water of 50° C., 64 parts of sodium sulfate, 25 parts of Na₂SiF₆, 20 parts of 80% acetic acid and 12 parts of the levelling assistant comprising 8.0 parts of the compound of the formula

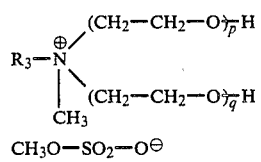

$p+q=34$, wherein $R_3$ is a $C_{17}$-$C_{21}$hydrocarbon radical;

30.0 parts of N,N′-dimethylolethylene urea, 0.7 part of the adduct of 5 moles of ethylene oxide and 1 mole of 2-ethyl-n-hexanol, 2.0 parts of a sulfated fatty amine polyglycol ether and 59.3 parts of water, based on 100 parts of levelling assistant.

After addition of a solution of 7.2 parts of the 1:1 chorimum complex of the dye of the formula

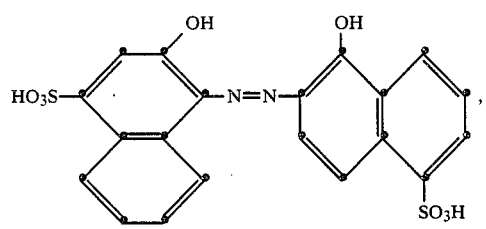

2.1 parts of the 1:1 chromium complex of the dye of the formula

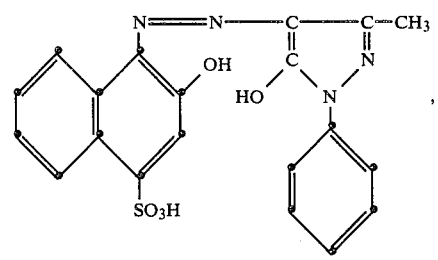

1.5 parts of the 1:1 chromium complex of the dye of the formula

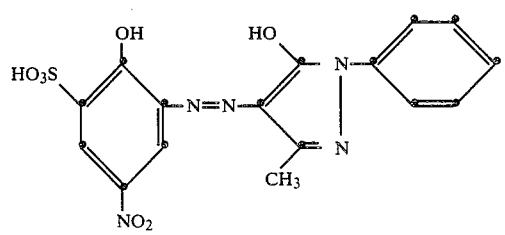

and 5.1 parts of the 1:1 chromium complex of the dye of the formula

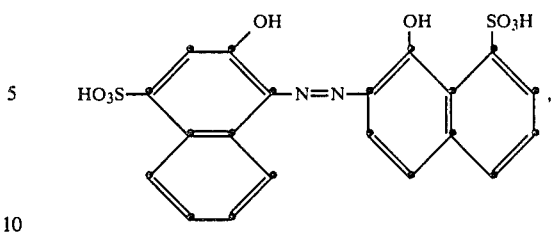

the dyebath is kept for 10 minutes at 50° C. and then heated to 70° C. at a heating-up rate of 1° C./min, then kept for 20 minutes at 70° C. and subsequently heated to 98° C. at a heat-up rate of 1° C./min. The pH is 4.3 at the commencement of dyeing. After a dyeing time of 90 minutes at 98° C., the dyebath is cooled to 60° C. and drained off. The navy blue wool yarn is rinsed twice for 10 minutes at 50° C. and then for 5 minutes at room temperature, and dried in conventional manner. The navy blue dyeing obtained has excellent levelness and has good fastness properties.

EXAMPLE 5

100 parts of polyamide 6,6 textured tricot are pretreated for 10 minutes in a dyebath which contains, in 4000 parts of water of 40° C., 1 part of Na₂SiF₆, 4 parts of ammonium acetate and acetic acid to adjust the pH to 4.5. After addition of a solution of 0.45 part of the 1:1 chromium complex of the dye of the formula

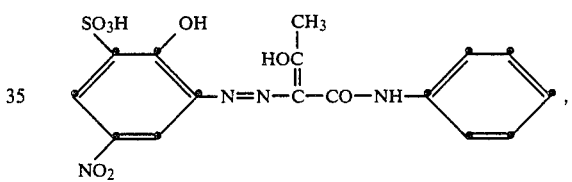

0.55 part of the 1:1 chromium complex of the dye of the formula

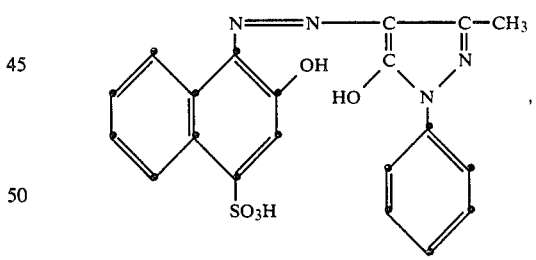

0.16 part of the 1:1 chromium complex of the dye of the formula

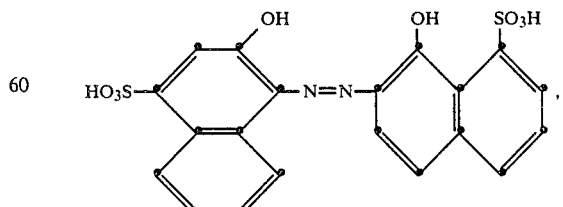

the dyebath is heated to 98° C. over the course of 45 minutes. Dyeing is carried out for 90 minutes at 98° C.

and the bath is then cooled to 60° C. The medium brown dyeing obtained is somewhat purer and fuller than that obtained under the same conditions without the addition of Na₂SiF₆.

What is claimed is:

1. A process for dyeing natural or synthetic polyamide fiber material which comprises contacting said material at a pH in the range of 3 to 7 with an aqueous liquor comprising: (a) a 1:1 metal complex dye which contains sulfo groups; and (b) a salt selected from the group consisting of alkali metal fluoride, ammonium fluoride, alkali metal fluorosilicate, ammonium fluorosilicate, alkali metal fluoroborate and ammonium fluoroborate, for a time and at a temperature sufficient to obtain level shades of good fastness.

2. A process according to claim 1, wherein dyeing is carried out in the presence of an alkali metal fluoride or ammonium fluoride.

3. A process according to claim 2, wherein dyeing is carried out in the presence of sodium or potassium fluoride.

4. A process according to claim 2, wherein dyeing is carried out in the presence of ammonium fluoride.

5. A process according to claim 1, wherein dyeing is carried out in the presence of sodium fluorosilicate or potassium fluorosilicate.

6. A process according to claim 1, wherein dyeing is carried out in the presence of ammonium fluorosilicate.

7. A process according to claim 1, which comprises using half to four times the amount by weight, of alkali metal fluoride or ammonium fluoride, alkali metal fluorosilicate or ammonium fluorosilicate, alkali metal fluoroborate or ammonium fluoroborate, based on the amount by weight of dye employed.

8. A process according to claim 1, wherein the pH range of 3 to 7 is adjusted with an organic acid, and wherein there is used in addition to an alkali metal fluoride or ammonium fluoride, alkali metal fluorosilicate or ammonium fluorosilicate, alkali metal fluoroborate or ammonium fluoroborate, another ammonium or alkali metal salt, selected from the group consisting of acetates and sulfates.

9. A process according to claim 1, wherein dyeing is carried out in a pH range from 4 to 6.

10. A process according to claim 1, wherein dyeing is carried out in the presence of a levelling assistant or a mixture of levelling assistants.

11. A process according to claim 10, which comprises the use of a levelling assistant consisting of a compound of the formula

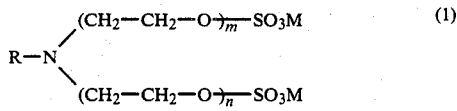

wherein R is an alkyl or alkenyl radical of 12 to 22 carbon atoms, M is hydrogen, an alkali metal or ammonium cation, and m and n are integers, the sum of m+n being from 2 to 14; or of a compound of the formula

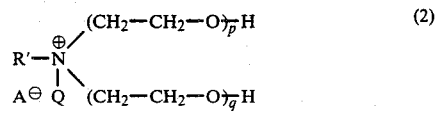

wherein R' independently of R has the meaning of R, A is an anion, Q is an unsubstituted or substituted alkyl radical and p and q are integers, the sum of p+q being from 2 to 50; or of a compound of the formula

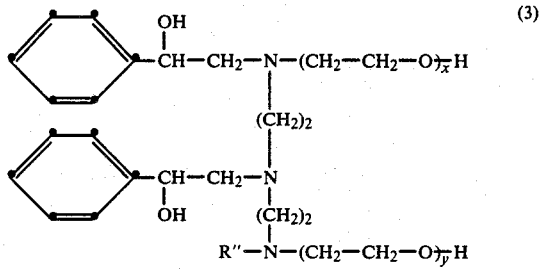

wherein R" independently of R has the meaning of R and x and y are integers, the sum of x+y being from 80 to 140; or of a mixture comprising compounds of the formulae (1) and (2) or of a mixture comprising compounds of the formulae (1), (2) and (3).

12. A process according to claim 11, which comprises the use of a mixture of levelling assistants containing 5 to 70 parts by weight of compounds of the formula (1), 15 to 60 parts by weight of the compound of formula (2), and 5 to 60 parts by weight of the compound of formula (3), based on 100 parts by weight of said mixture, wherein R, R' and R" in formulae (1), (2) and (3) are independently an alkyl or alkenyl radical of 16 to 22 carbon atoms.

13. A process according to claim 11, which comprises the use of a compound of formula (2), wherein A and Q are derived from a quaternising agent selected from the group consisting of chloroacetamide, ethylene chlorohydrin, ethylene bromohydrin, epichlorohydrin, epibromohydrin or dimethyl sulfate.

14. A process according to claim 11, which comprises the use of a mixture of levelling assistants which, in addition to containing the compounds of the formulae (1), (2) and (3), wherein the sum of p+q in formula (2) is from 20 to 50, also contains an adduct of 60 to 100 moles of ethylene oxide with 1 mole of a $C_{15}$-$C_{20}$alkenyl alcohol.

15. A process according to claim 11, which comprises the use of a mixture of levelling assistants which contains the compounds of the formulae (1) and (2), wherein the sum of p+q in formula (2) is 4 to 10.

16. A process according to claim 11, which comprises the use of a levelling assistant which contains compounds of formula (2), wherein the sum of p+q in formula (2) is 30 to 40, and R' is a $C_{15}$-$C_{22}$alkyl radical.

17. A process according to claim 11, which comprises using 0.3 to 3 percent by weight of levelling assistant or mixture of levelling assistants, based on the fibre material.

18. A process according to claim 1, which comprises using a 1:1 chromium complex azo dye containing 1 to 3 sulfo groups.

19. A process according to claim 18 for trichromatic dyeing, which comprises using a mixture of at least three 1:1 chromium complex azo dyes selected from yellow or orange, red and blue dyes.

20. A process according to claim 19, which comprises the use of a 1:1 chromium complex azo dye of the formula

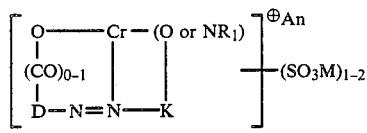

wherein —(CO)$_{0-1}$—O and —(O— or NR$_1$) are linked to D and K adjacent to the azo bridge, D is a benzene or naphthalene radical which is unsubstituted or substituted by halogen, C$_1$–C$_4$alkyl, C$_1$–C$_4$alkoxy, nitro or sulfamoyl, K is a phenyl, naphthyl, 1-phenyl-3-methyl-pyrazol-5-one, acetoacetamide or quinoline radical, each unsubstituted or substituted by halogen, C$_1$–C$_4$alkyl, C$_1$–C$_4$alkoxy, C$_2$–C$_4$alkanoylamino, sulfamoyl or hydroxy, R$_1$ is hydrogen, M is an alkali metal cation, and An is an anion.

21. A process according to claim 1 wherein polyamide material is used as fiber material.

22. A process according to claim 1, wherein dyeing is carried out from an aqueous bath by the exhaust process in the temperature range from 80° to 105° C.

23. A process according to claim 1, wherein dyeing is carried out at a liquor to goods ratio of 1:8 to 1:80.

24. A process according to claim 1, wherein the dyebath contains further assistants.

25. A composition comprising at least one 1:1 metal complex dye and an alkali metal fluoride or ammonium fluoride, alkali metal fluorosilicate or ammonium fluorosilicate or alkali metal fluoroborate or ammonium fluoroborate.

26. A process for dyeing natural or synthetic polyamide fiber material, which comprises contacting said polyamide fiber with a composition as claimed in claim 25.

27. A process according to claim 7 wherein said amount of alkali metal or ammonium fluoride, fluorosilicate or fluoroborate is one to three times the weight of dye employed.

28. A process according to claim 27 wherein said amount of alkali metal or ammonium fluoride, fluorosilicate or fluoroborate is two to three times the weight of dye employed.

29. A process according to claim 8 wherein said organic acid is acetic acid.

30. A process according to claim 8 wherein said alkali metal is sodium.

31. A process according to claim 9 wherein said pH range is from 4 to 5.

32. A process according to claim 21 wherein said polyamide fiber is silk or wool.

33. A process according to claim 17 wherein the weight of said levelling assistant or mixture of levelling assistants is 1 to 2 percent by weight, based on the fiber material.

34. A process according to claim 18 wherein said chromium complex azo dye contains 1 to 2 sulfo groups.

35. A composition according to claim 25 wherein said metal complex dye is a 1:1 chromium complex dye.

* * * * *